(12) United States Patent  
Kelly et al.

(10) Patent No.: US 6,655,893 B2  
(45) Date of Patent: Dec. 2, 2003

(54) EXTENSIBLE CONVEYOR AND FRAME FOR VEHICLE LOAD TRANSFER

(75) Inventors: Dennis L. Kelly, Goshen, AR (US); Richard L. Glines, Lowell, AR (US)

(73) Assignee: Multi-Craft Contractors, Inc., Springdale, AR (US)

( * ) Notice: Subject to any disclaimer, the term of this patent is extended or adjusted under 35 U.S.C. 154(b) by 0 days.

(21) Appl. No.: 10/128,177

(22) Filed: Apr. 23, 2002

(65) Prior Publication Data

US 2003/0196873 A1 Oct. 23, 2003

(51) Int. Cl.[7] .................................................. B65F 9/00
(52) U.S. Cl. ...................... 414/393; 414/398; 198/588; 198/812; 198/370.1; 198/370.01
(58) Field of Search .................................. 414/398, 393, 414/588, 812, 370.1, 370.01, 370.06, 312; 198/315

(56) References Cited

U.S. PATENT DOCUMENTS

| | | | | | |
|---|---|---|---|---|---|
| 776,825 A | * | 12/1904 | Buffum | ...................... | 414/398 |
| 1,650,053 A | * | 11/1927 | Straight | ...................... | 414/398 |
| 3,356,236 A | * | 12/1967 | Shaw et al. | .................. | 414/398 |
| 4,425,069 A | * | 1/1984 | Saur et al. | .................... | 414/398 |
| 5,487,462 A | * | 1/1996 | Gilmore | ...................... | 198/594 |
| 5,685,416 A | * | 11/1997 | Bonnet | ....................... | 198/812 |
| 6,006,893 A | * | 12/1999 | Gilmore et al. | ............. | 198/588 |
| 6,065,923 A | * | 5/2000 | Foster | ......................... | 414/401 |
| 6,481,563 B1 | * | 11/2002 | Gilmore | ..................... | 198/511 |
| 6,484,862 B1 | * | 11/2002 | Gilmore et al. | ......... | 193/35 TE |

* cited by examiner

*Primary Examiner*—Joseph A. Dillon  
(74) *Attorney, Agent, or Firm*—Head, Johnson & Kachigian

(57) ABSTRACT

An apparatus and method for rapidly loading vehicles or other load carrying compartments has an extensible conveyor attached to a base frame by means of a wheel and track design. The load may be applied to the extensible conveyor from any direction by a variety of means. Items are applied to the extensible conveyor until the load is substantially equivalent to the maximum load capacity of the load carrying compartment. The conveyor is then extended into the compartment and retracted. As it retracts, the load remains within the compartment. The device preferably has a number of safety features to avoid accidents. The invention also preferably has a means of properly aligning itself

5 Claims, 14 Drawing Sheets

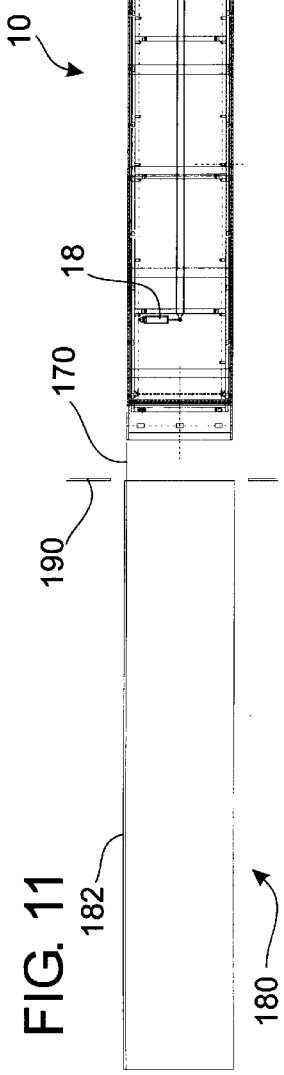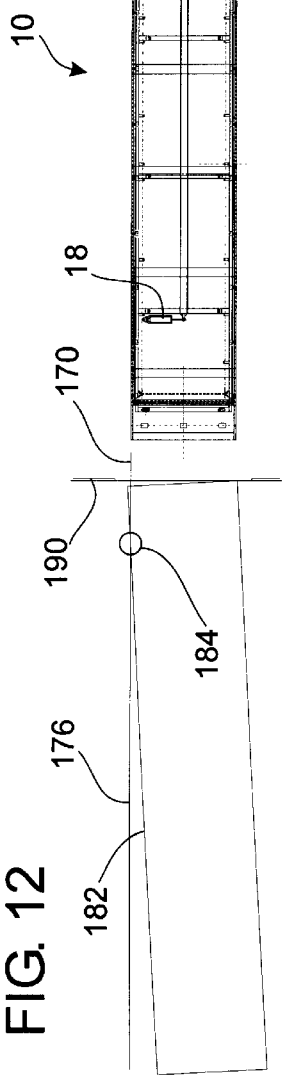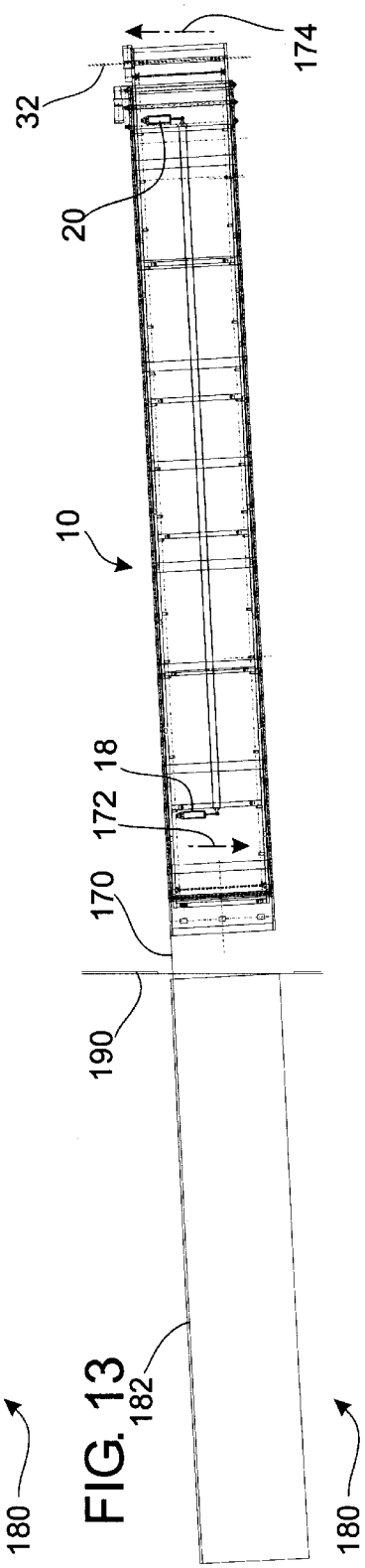

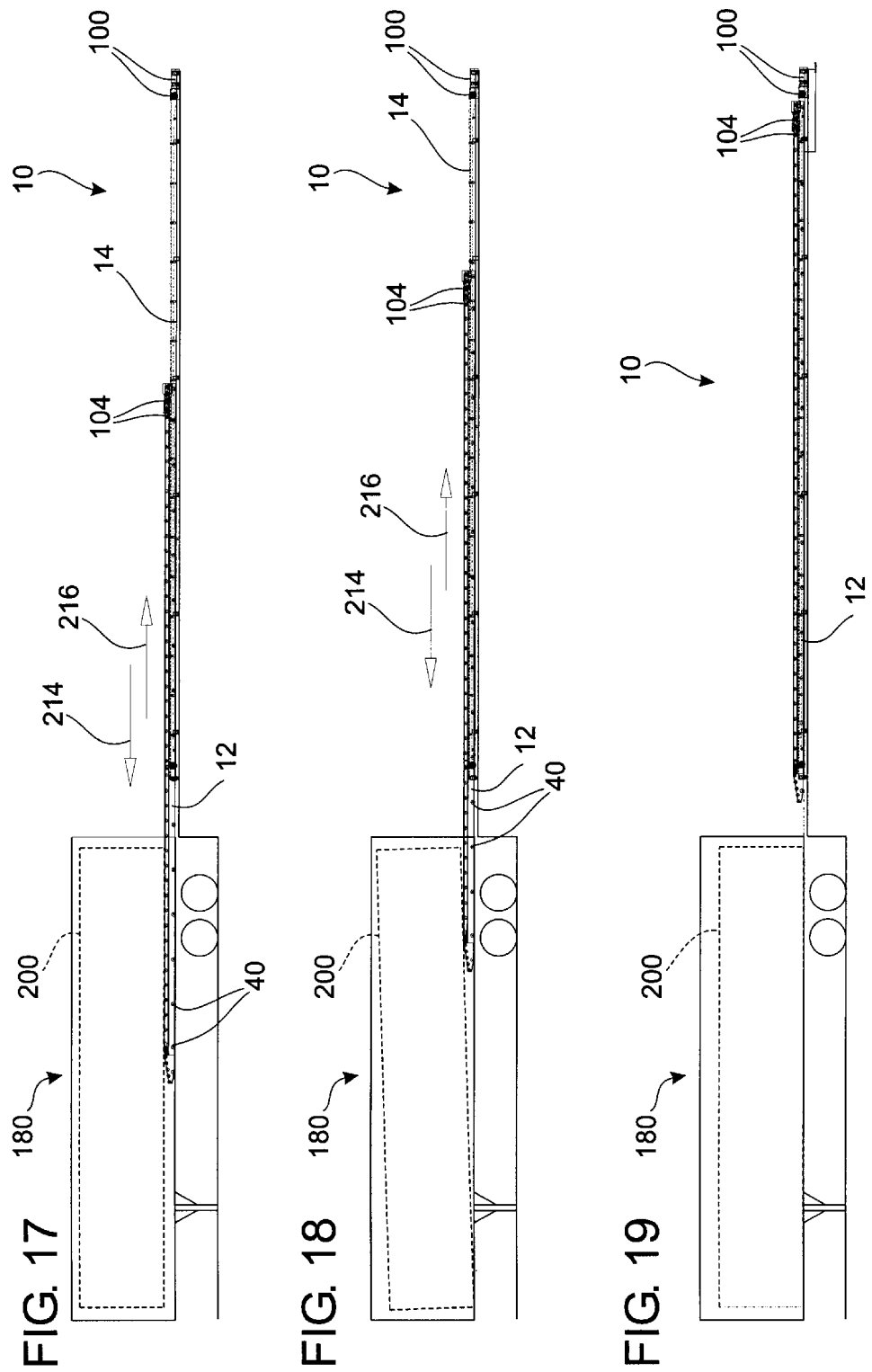

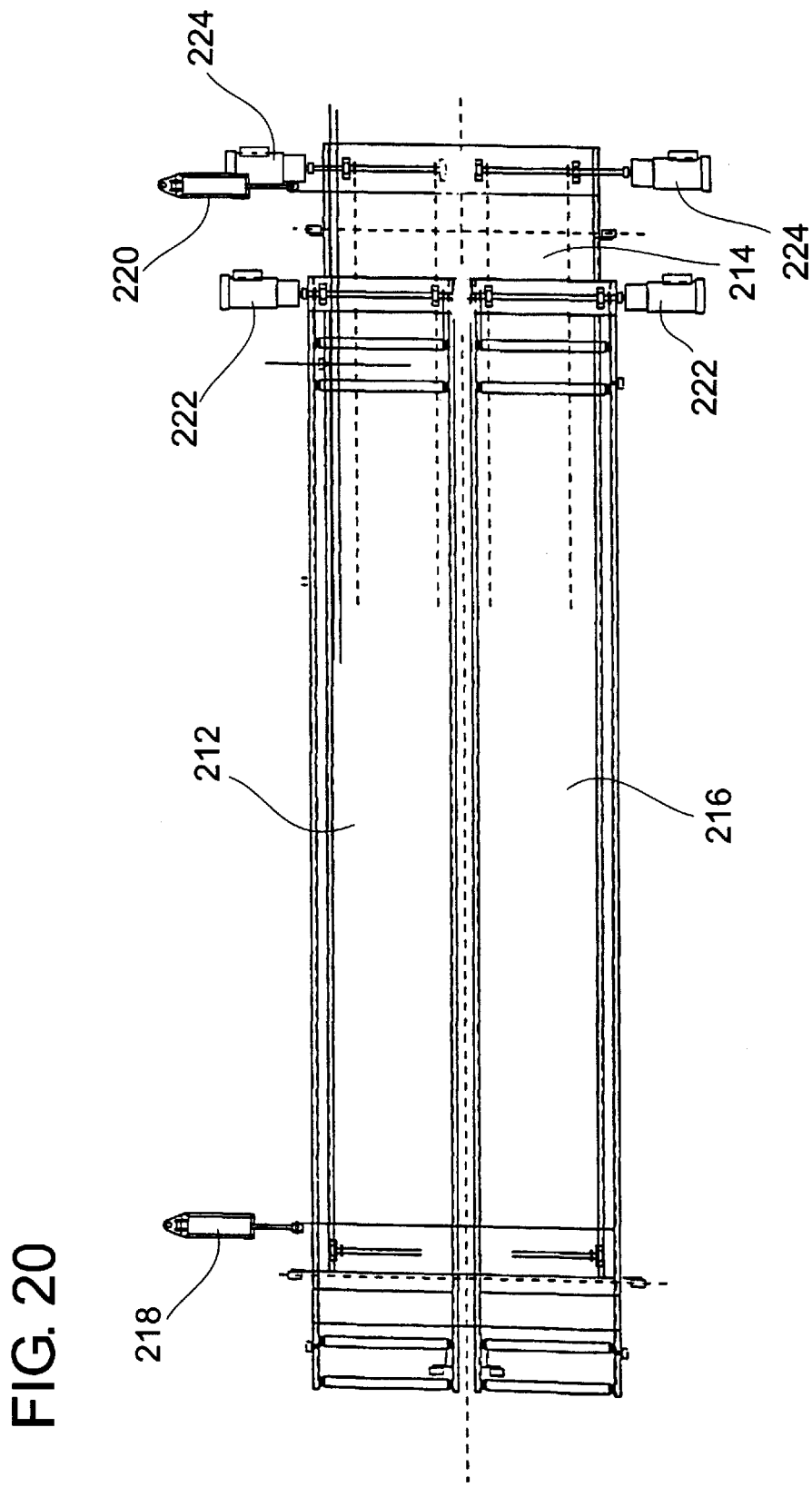

EXTENSIBLE CONVEYOR AND FRAME FOR VEHICLE LOAD TRANSFER

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO A SEQUENCE LISTING A TABLE OR A COMPUTER PROGRAM LISTING COMPACT DISC APPENDIX

Not applicable.

BACKGROUND OF THE INVENTION

1. Field of the Invention

The present invention relates to an apparatus and method for rapidly loading items onto vehicles. More specifically, the present invention relates to a method and apparatus for transferring simultaneously a quantity of items sufficient to load a vehicle to its capacity. A conveyor with a powered belt or powered rollers carrying the load is extended into the vehicle. The conveyor belt then slides out from underneath the load leaving the load within the vehicle as it retracts.

2. Prior Art.

Shipping is a major industry in this country. Thousands of airplanes, trains, ships, and trucks, transport millions of tons of all types of products across the nation and around the world. It is an industry that will never disappear. It is, therefore, a very competitive industry. Companies are constantly striving to increase the speed and efficiency with which they can transport products.

One of the bottlenecks in the shipping process is the loading and unloading of products from transportation vehicles. Most devices designed to load products into transportation vehicles only carry a relatively small number of items when compared to the total volume of a transportation vehicle.

For example, in the overland trucking industry, semi-trailers are often loaded by hand. Person's are capable of carrying only a relatively small amount of material into a trailer and must be paid wages. This is very inefficient and very expensive.

Forklifts are sometimes employed to increase efficiency. Forklifts may carry more material than persons. However, because of the confined space within a trailer, it is very difficult to maneuver the forklift while in the trailer or other load carrying compartment. In addition, when using a forklift, the trailer must be precisely aligned with the docking bay so that the to forklift has an uninterrupted surface over which to drive. The inventors have identified another very significant difficulty in loading vehicles that greatly reduces the efficiency of the loading and unloading processes. Load carrying vehicles and compartments, such as trailers, vans and cargo ship load compartments all may only be accessed from one side. Only one forklift may load a truck at one time because it must enter and exit through the single door of the trailer. If a load of items to be transported could be stacked together from several directions, it would greatly accelerate the loading process. In addition, it would allow a wider variety of devices, such as cranes, to contribute to the loading process. This also holds true for the unloading process. All of the factors listed above make loading and unloading a trailer arduous, inefficient and slow. It can often take in excess of three hours to load or unload a semi-trailer.

Because of the long amount of time required to load and/or unload a trailer, distribution centers and warehouses often utilize several loading bays. This allows more trucks to be gradually loaded and unloaded at the same time. While this may increase the number of trucks that may be loaded, it also greatly increases the labor cost. Although shipping capacity is increased, efficiency is not.

In order to improve efficiency, some companies have utilized conveyor systems. Telescoping frames having a series of rollers are extended into the back of a trailer for unloading. Items are placed on the conveyor and given a push. Items then slide across the rollers to the other end of the conveyor frame and out of the trailer. Although the presence of the conveyor prevents use of a forklift, the speed with which a person may work is greatly increased. While use of a conveyor offers some advantages, it still has inherent disadvantages. It is still a very labor intensive process. The relatively confined area within the trailer limits the number of persons who may load or unload the trailer. In addition, items are prone to fall off either side of the conveyor. Those skilled in the art will be very familiar with these conveyor systems and their shortcomings.

These difficulties are not confined to the overland trucking industry. Load carrying compartments are utilized by trains, barges, cargo ships and airplanes. All aspects of the shipping industry would benefit from a more efficient method of transferring a load into a load carrying compartment.

It is therefore desirable to develop a way of rapidly and efficiently loading trucks.

It is also desirable to develop a method for rapidly and efficiently loading trucks without the need for precisely aligning trailers to their docking bays.

It is also desirable to circumvent the disadvantages caused by the relatively confined space and limited access of a trailer to allow rapid deposition of the load to be transported.

It is also desirable to develop a method for loading and unloading transportation vehicles that requires relatively few loading docks.

BRIEF SUMMARY OF THE INVENTION

The present invention is an apparatus and method for rapidly transferring a load equal to the entire volume of a load carrying compartment at one time. A base frame is designed to be attached to the floor inside a loading dock. On top of the base frame rests an extensible conveyor. The extensible conveyor may be extended horizontally in a telescoping fashion such that it may be extended into a trailer or other load carrying compartment that has engaged the loading dock.

Preferably, the base frame is capable of a horizontal swiveling action. This allows the direction in which the conveyor is extended to be adjusted. This allows the extensible conveyor to extend into load carrying compartments that are not precisely aligned with the loading dock to which they are engaged. The extensible conveyor is capable of extending into the load carrying compartment such that it covers substantially the entire floor of the compartment.

Once the frame and conveyor are aligned with the load carrying compartment, the load is applied to the conveyor. The load transfer device is located on the inside floor of the docking bay and is accessible from all sides. This allows several men, forklifts and other loading systems to apply the load to the extensible conveyor from all directions. A load substantially equal to the carrying capacity of the load carrying compartment is applied to the extensible conveyor prior to being extended into the compartment. The conveyor is then extended into the load carrying compartment. The extensible conveyor is then slowly retracted so that it eventually comes to rest in its original position, completely on top of the fixed frame. As the conveyor retracts, the conveyor belt is activated in a direction opposite to the motion of retraction. The conveyor belt moves at the same rate of speed as the retraction of the extensible conveyor. In this fashion, the load is slid off the extensible conveyor such that it remains within the load carrying compartment. When the extensible conveyor has been entirely retracted onto the fixed frame, the entire load has been completely placed in the load carrying compartment.

This method of loading compartments offers many advantages to current methods. Because the extensible conveyor is accessible from all sides including above it, a variety of machines as well as persons may stack items that comprise the total load simultaneously. Using current methods, only a few persons or a single forklift may enter a load compartment such as a trailer at one given time. Conveyors have only limited access to the inside of the compartment, while cranes generally have no access whatsoever. Use of an extensible conveyor allows items to be stacked using conveyors, cranes, forklifts and other devices known to those skilled in the art.

The present load transfer device and method allows several persons and devices to stack the load of products to be transported because the extensible conveyor is accessible from every direction. It allows a vehicle or load carrying compartment to be loaded in a fraction of the amount of time it takes to load a vehicle using current methods.

Because a load may be deposited into a load carrying compartment significantly more rapidly, fewer loading docks are required to load and transport the same amount of materials. A significant amount of time is also saved because compartments such as trailers no longer need to be accurately and precisely aligned with the docking bay. The swiveling action of the frame allows trailers and other compartments to be aligned less accurately and therefore much more easily.

The present invention may be designed in any variety of sizes, depending upon the desired application. Smaller versions of the invention may be used for loading and unloading vans and package cars. Larger embodiments of the invention, may be used to load trailers, trains, airplanes, cargo ships and compartments used therein.

The frame and conveyor apparatus may be aligned with the load carrying compartment using lasers, extensible rods, optical alignment tools and other methods well known to those skilled in the art.

It is also preferable to include a number of safety devices on the invention. Emergency shut-off switches may be located at a variety of points on the invention. In addition, sensors at the front of the extensible conveyor may be used to detect a persons within the load compartment and stop the invention so as not to crush those persons.

Various alignment tools may also be used to insure that the load stacked on the extensible conveyor will fit into the load carrying compartment.

It is therefore an object of the present invention to provide an apparatus and method for rapid, efficient loading or a load carrying compartment.

It is another object of the present invention to provide an apparatus and method for circumventing the difficulties and limitations imposed by the restricted access to existing load carrying compartments.

It is another object of the present invention to provide an apparatus and method for inserting a load substantially equal to the total carrying capacity of a load carrying compartment simultaneously.

BRIEF DESCRIPTION OF THE SEVERAL VIEWS OF THE DRAWING

FIG. 11 shows a top plan view of the invention illustrating the method of alignment FIG. 12 shows a top plan view of the present invention illustrating the method of alignment.

FIG. 13 shows a top plan view of the present invention illustrating the method of alignment.

FIG. 17 shows a side plan view of the present invention illustrating the method of load transfer.

FIG. 18 shows a side plan view of the present invention illustrating the method of load transfer.

FIG. 19 shows a side plan view of the present invention illustrating the method of load transfer.

FIG. 20 shows a top plan view of an alternative embodiment of the present invention.

DETAILED DESCRIPTION OF THE INVENTION

The present invention is an apparatus and method for rapidly transferring a load equal to the entire volume of a load carrying compartment at one time. A base frame is designed to be attached to the floor inside a loading dock. On top of the fixed frame, rests an extensible conveyor.

FIGS. 1–10 illustrate the extensible conveyor and frame.

Figure 1:
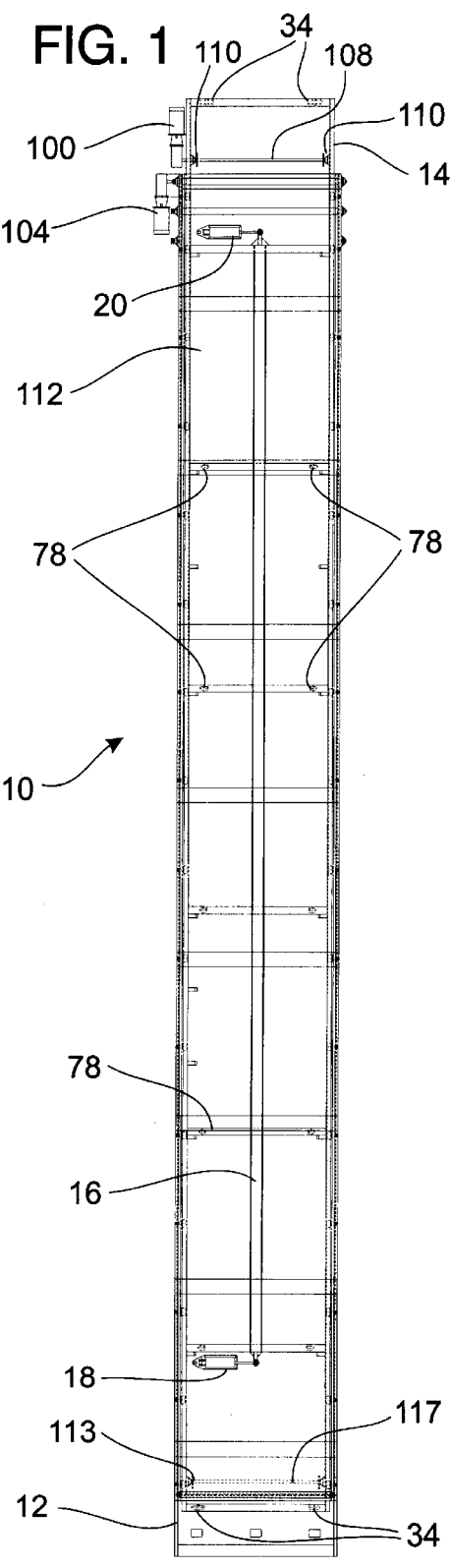
FIG. 1 shows a top plan schematic diagram of the invention.
Figure 2:
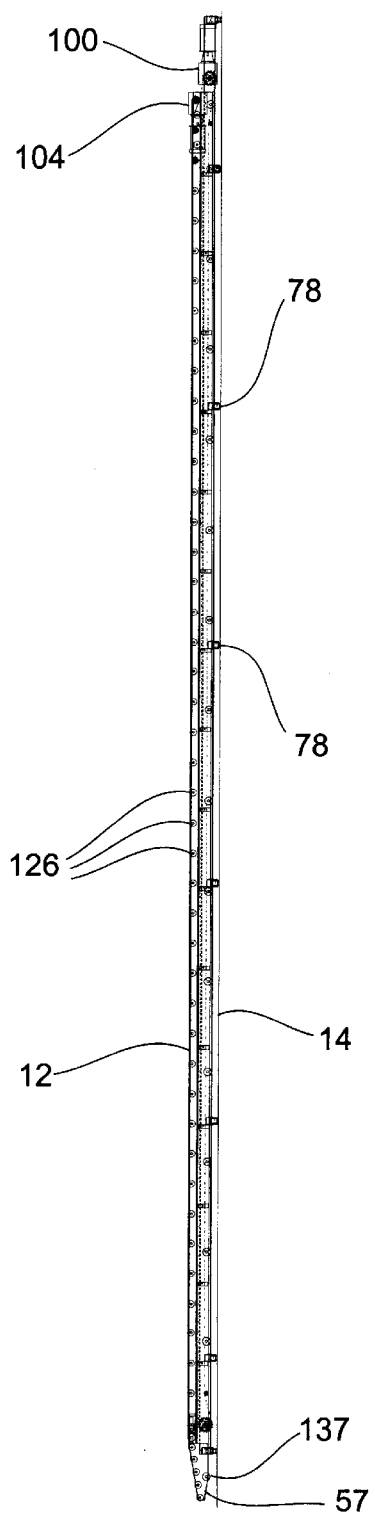
FIG. 2 shows a side plan view of a schematic diagram of the invention.

FIGS. 1 and 2 show top and side views of a schematic diagram of the load transfer device. Extensible conveyor 12 rests on top of base frame 14. Base frame 14 rests on the floor of a docking bay or other vehicle loading area. It is supported by support wheels 78 and track wheels 34. Support wheels 78 and track wheels 34 rest on axis that are parallel to the length of the base frame and therefore allow movement perpendicular to the telescoping motion of the extensible conveyor. Pistons 18 and 20 are attached to the floor of the loading area and also to the base frame. By actuating these pistons, the position of the base frame may be adjusted. In FIG. 2, support rollers 126 may be seen. These support rollers 126 lie underneath and support the conveyor belt. Conveyor motor 104 and extension motor 100 may also be seen.

Extension motor 100 actuates extension access 108. Extension gears 110 are attached to axis 108 and are also actuated by extension motor 100. Extension drive chains 112 each form a loop and wrap around drive gears 110 and extend all the way down to forward end gears 113 which are located on forward axis 117. Axis 117 and gears 113 may be adjusted so as to adjust the tension on drive chain 112. Drive chain 112 is attached to the bottom of the rear end of extensible conveyor 12 so that when extension motor 100 actuates gears 110 and cause drive chain 112 to move conveyor 12 moves also.

Figure 3:
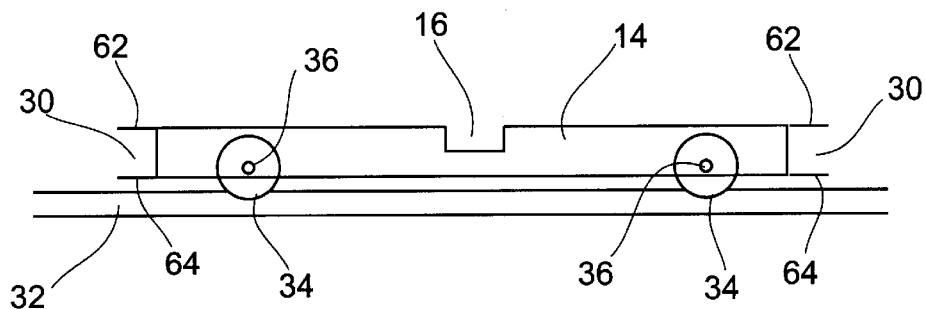
FIG. 3 shows a rear plan view of the base frame of the invention, having some components omitted for clarification.

FIG. 3 shows a rear plan view of the base frame 14 without an extensible conveyor 12 attached. Track wheels 34 are shown attached to frame 14 by axis 36. Track wheels 34 rest on track 32. On either side of frame 14 are extension wheel tracks 30. Extension wheel tracks 30 are formed by upper ridges 62 and lower ridges 64. Extension motor 100 is omitted for clarification. Well 16 can also be seen in FIG. 3. As will be described below, electrical wiring rests inside this well and connects the load transfer device controls to the extensible conveyor.

Figure 4:
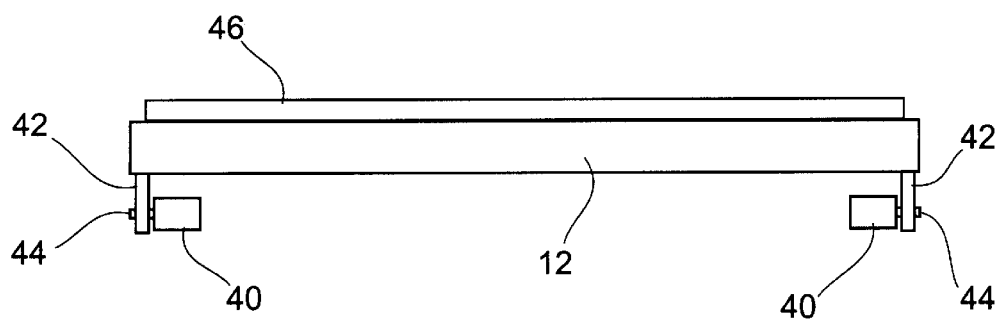
FIG. 4 shows a rear plan view of the extensible conveyor, having some components removed for clarification.

FIG. 4 shows a rear plan view of the extensible conveyor 12. Conveyor belt 46 is located on the top of conveyor 12. Extension wheels 40 rotate about axis 44. Axis 44 also attach extension wheels 40 to wheel frame 42.

Figure 5:
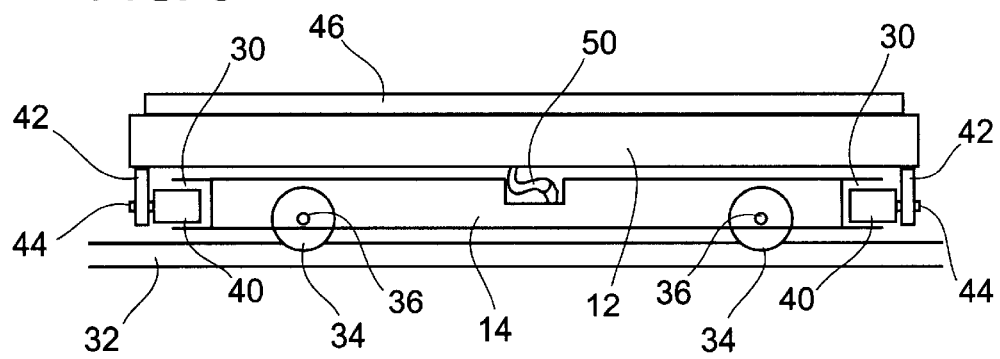
FIG. 5 shows a rear plan view of the invention having some components omitted for clarification.

FIG. 5 shows a rear plan view of frame 14 in conveyor 12 attached to one another. Extension wheels 40 run inside extension track 30. Conveyor 12 makes no contact with the floor. Also, connection lines 50 are shown within trench 16. Wheel frames 42 are designed such that only extension wheels 40 make any contact with frame 14. Because wheels 40 rest within extension track 30, conveyor 12 is firmly attached to frame 14. Those skilled in the art will have seen similar systems of wheels and tracks that allow one device to move on top of or adjacent to a frame. Those skilled in the art will also appreciate that there are a variety of other wheel and track systems that would be suitable for use in the present invention.

Because the device is intended to support and move very heavy loads, both frame 14 and conveyor 12 must be composed of very strong material. Preferably, frame 14 and conveyor 12 will be predominantly composed of a metal or metal alloy. Those skilled in the art will appreciate the necessity of building the load transfer device out of strong materials.

Figure 6:
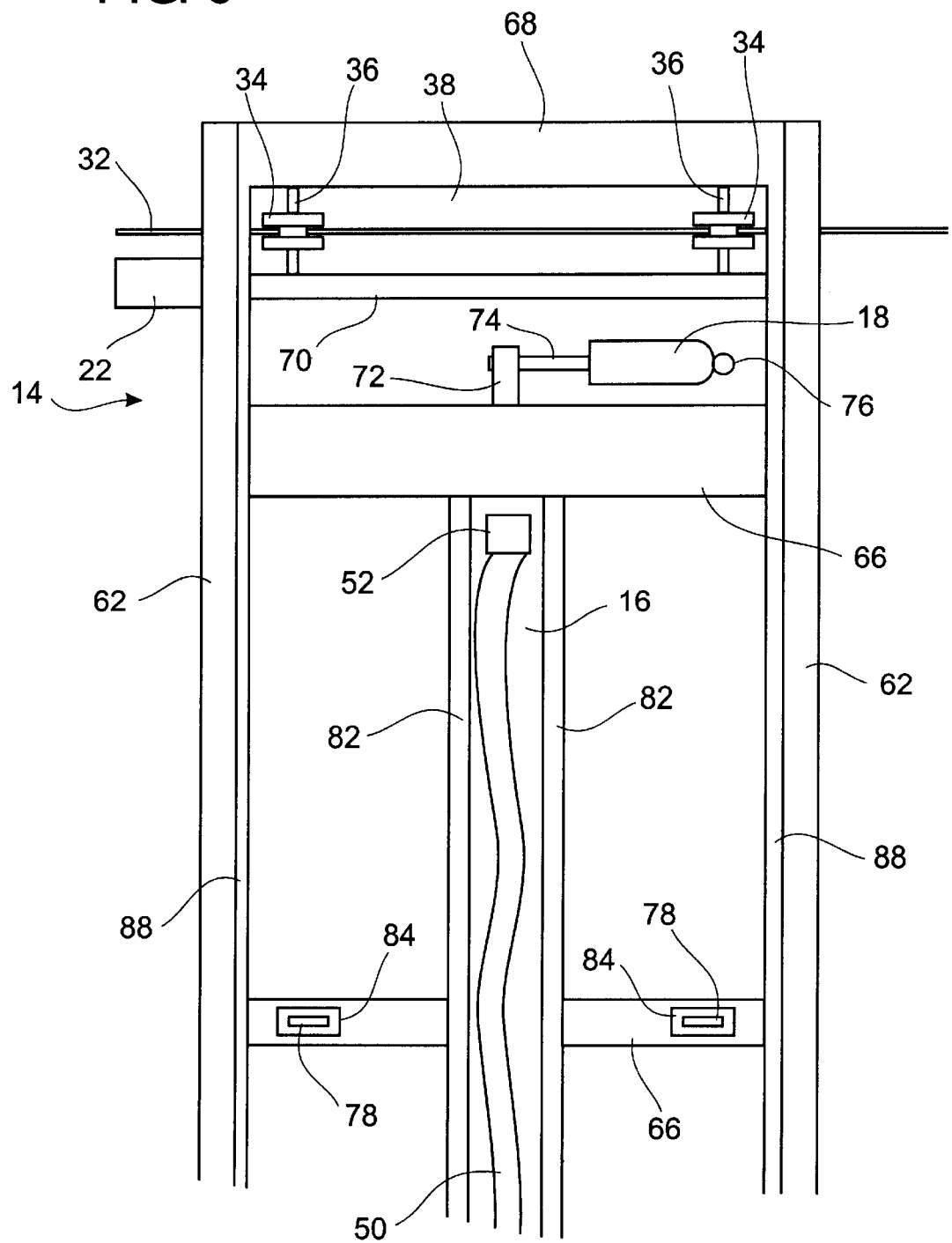
FIG. 6 shows a top plan view of the forward end of the base frame of the invention.

FIG. 6 shows a top plan view of the front portion of frame 14. Connection well 16 has connection lines 50 within it. Connection lines 50 are flexible and attached to connection point 52. From there, the electronic wiring within connection line 50 connects to a control center 22. Control center 22 contains circuitry well known to those skilled in the art. Control center 22 turns the device on and off, adjusts the safety features, and adjusts the speeds of the motors. Upper track ridge 62 is attached to lateral frame members 88.

Connection trench 16 is formed by sidewalls 82. Sidewalls 82 prevent connection lines 50 from interfering with or getting tangled within other aspects of the device.

Rear frame member 68 is attached to lateral frame members 88. Rear frame member 68 and support frame 70, in conjunction with lateral frame members 88 form rear track wheel well 38. Two track wheels 34 are located within well 38 and are attached to rear frame member 68 and support frame 70 by axis 36. FIG. 6 also shows support wheels 78 within support wheel wells 84.

Piston 18 is found within the base frame. At ground attachment point 76, the piston attaches to the floor upon which the frame rests. Piston rod 74 attaches to attachment point 72. When the piston moves, the front end of the frame moves with it. This allows the frame to move perpendicular to the direction in which the extensible conveyor extends. As is described in more detail below, piston 18, in conjunction with piston 20, allows the frame to conduct swiveling action so as to properly align with a load transfer vehicle. In this particular embodiment, a hydraulic piston is used. However, those skilled in the art will realize that any device capable of performing back and forth motion of sufficient power will be suitable for the present invention. Gas and electric powered motors may be attached to rods 74 and perform the same function. The rear end of the base frame has a track wheel well, track wheels and a piston to create swiveling action that is of the same design as the one shown in FIG. 6. Although not shown in detail, those skilled in the art will recognize the ease with which the swiveling mechanisms may be replicated on the opposite end of the device so as to enhance its swiveling ability.

Figure 7:
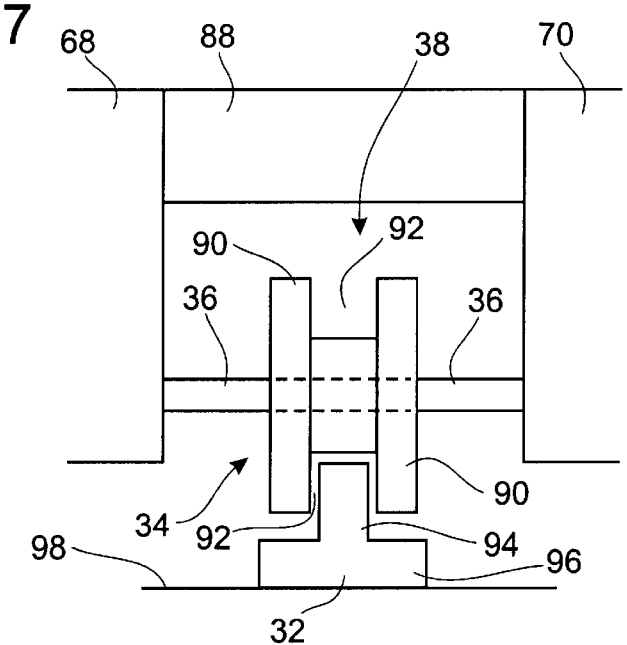
FIG. 7 shows an enlarged side plan view of the track wheel well and track wheel.

FIG. 7 shows a close up side view of a track wheel. Track wheel 34 rests on axis 36 within track wheel well 38. Lateral frame member 88, wheel frame 68 and support frame 70 may all be seen. Track wheel 34 has a central groove 92 formed by ridges 90 that extends around the entire circumference of the wheel. Track 34 is attached to ground 98 at its base 96. Track tongue 94 extends upward from base 96 and fits within groove 92. This tongue and groove design prevents track wheels 34 from falling off track 32. Axis 36 are substantially longer than necessary to penetrate wheel 34. This allows track wheel 34 to move back and forth along axis 36. When piston 18 is activated and frame 14 is moved, axis 36 and track 32 will no longer be exactly perpendicular to one another. Ordinarily, this would result in at least one track wheel 34 falling off of track 32. However, the present invention overcomes this difficulty. By forming a groove 92 slightly larger than necessary to fit tongue 94, a slight change in angle of the wheel is accommodated. Furthermore, because axis 36 is substantially longer than necessary, wheel 34 may move back and forth along axis 36 to accommodate changes in angles between the track and frame caused by actuation of either piston 18 or 20 or both. Those skilled in the art will appreciate the advantages created by this design.

Figure 8:
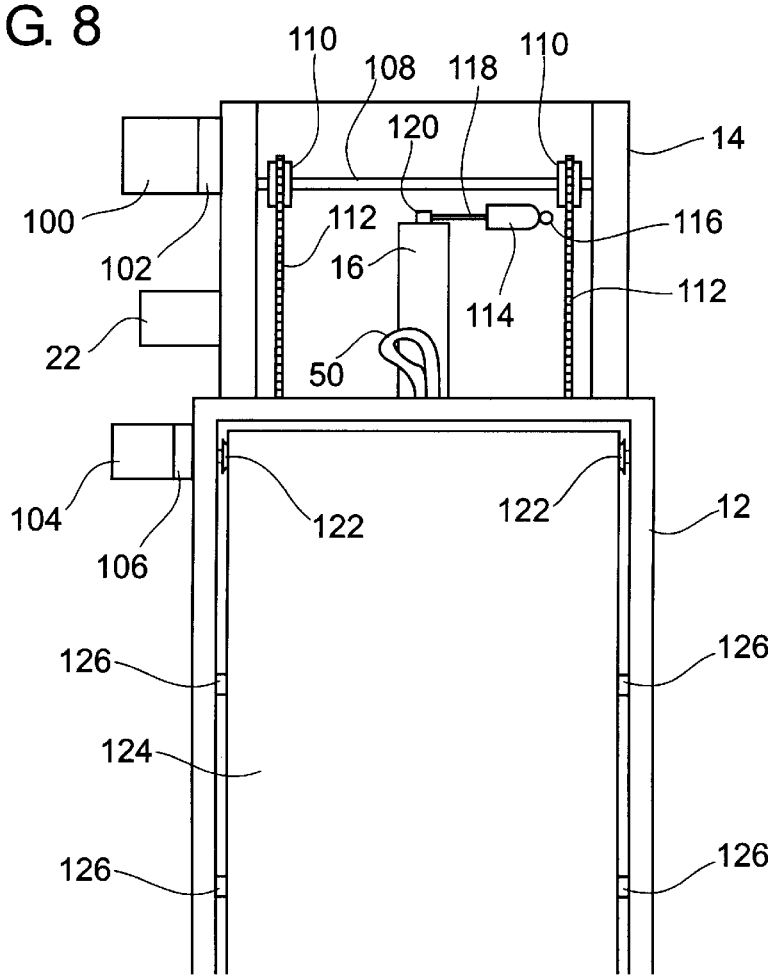
FIG. 8 shows a top plan view of the rear portion of the invention.

FIG. 8 is a top plan view of the rear portion of the load transfer device. Various aspects of the frame have been omitted for clarification. FIG. 8 shows the motor and drive mechanisms. Connection lines 50 can be seen forming into a loop shape. This is because conveyor 12 is partially extended. While connection line 50 is attached to the forward end of the frame, it is attached to the rear end of the conveyor. When the conveyor is fully retracted, the flexible connection line 50 lies flat within connection well 16. As conveyor 12 extends, connection line 50 begins to loop. As conveyor 12 retracts, extension line 50 lies back within trench 16. Those skilled in the art will appreciate that this is a common design utilized for connection lines located within telescoping devices. Connection lines 50 allow controller 22 to connect with and control conveyor motor 104, conveyor gear box 106 and safety features on the extensible conveyor that are explained in more detail below.

Extension motor 100 is connected to extension gear box 102. Extension gear box is then attached to extension axis 108. Gears 110 are located at either end of axis 108. Drive chains 112 are looped and extend around gears 110. Chains 112 are attached near the rear of the bottom side of conveyor 12. When motor 100 is actuated by controller 22 it drives axis 108. Gear box 102 regulates the speed and direction of axis 108. In this particular embodiment, a gear box is used to regulate the motion of axis of 108. However, those skilled in the art will appreciate that the speed of some motors may be directly regulated and there may be no need for gear box 102.

Attached to conveyor 12 is conveyor belt motor 104. Conveyor motor 104 is attached to conveyor gear box 106 which is attached to conveyor drive roller 122. As can be seen, drive roller 122 is tapered at either end. This taper design ensures proper movement of the conveyor belt along its track. This prevents the conveyor belt 124 from sliding to one side or another of the conveyor. Several support rollers 126 lie underneath conveyor belt 124. Those skilled in the art will appreciate the need for support rollers 126.

In this particular embodiment, only one drive roller is shown. However, those skilled in the art will appreciate that it may be desirable to utilize two or more drive rollers.

In this particular embodiment, support rollers 126 are not tapered at the ends. However, those skilled in the art will appreciate that it may be desirable to taper support rollers 126 to ensure proper movement of conveyor belt 124. In this particular embodiment, conveyor belt 124 is used for the top of conveyor 12. However, those skilled in the art will recognize that other devices such as a series of powered rollers may also be suitable.

The extension and retraction of conveyor 12 and the motion of the conveyor belt is relatively slow, about 6 ft. per minute. The speed may be increased or decreased as desired. However, decreasing the speed also decreases the efficiency with which vehicles may be loaded. Increasing the speed will increase efficiency. Unfortunately, it also increases the risk of injury to operators and the risk of damaging the items being transferred.

Figure 9:
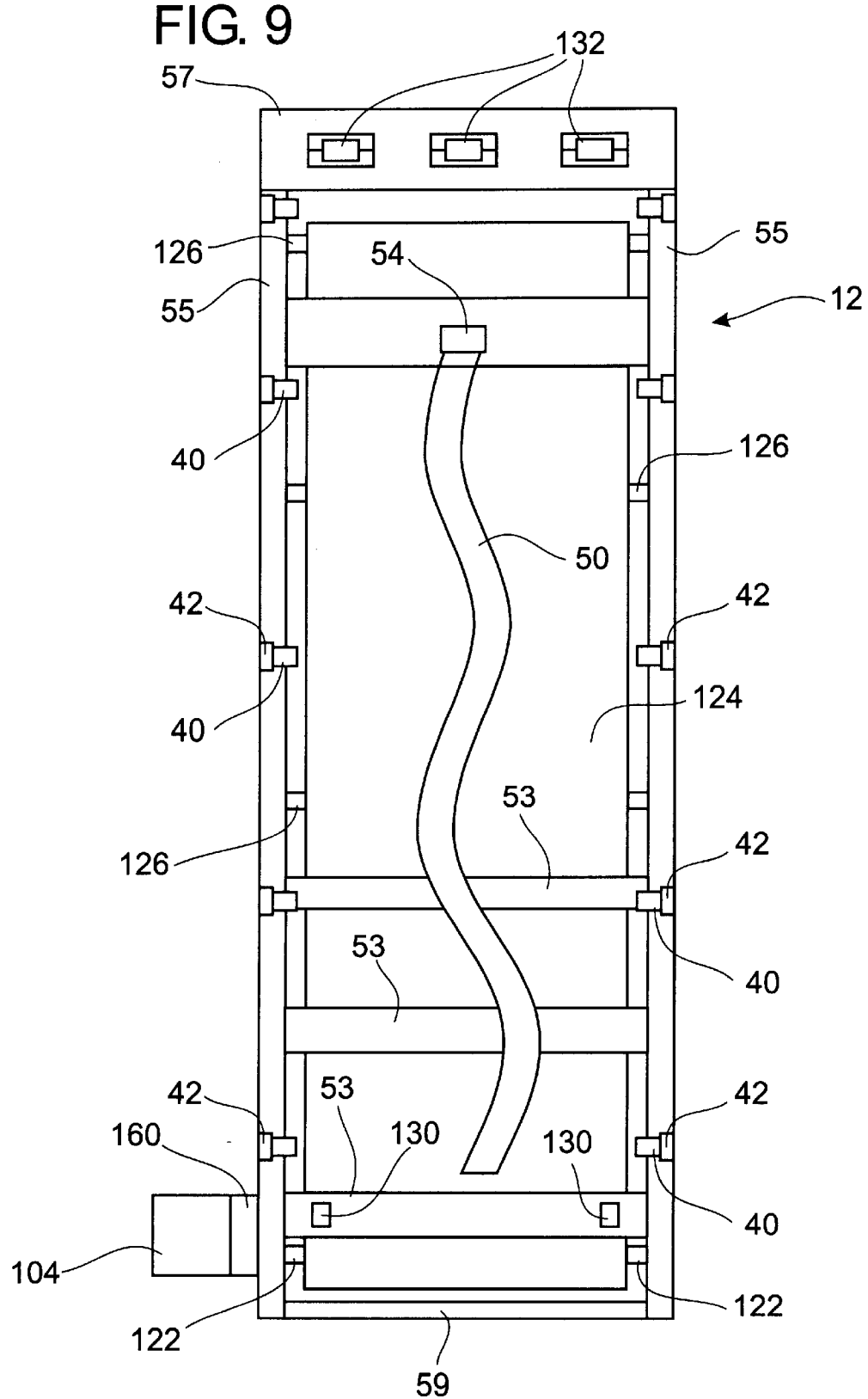
FIG. 9 shows a bottom plan view of the extensible conveyor of the invention.

FIG. 9 shows a bottom plan view of the conveyor 12. The frame of the conveyor is comprised of front wedge 57, lateral members 55, rear member 59 and the port members 53. Connection wires 50 are shown attached to attachment point 54. Attachment point 54 is connected to conveyor gear box 106 and conveyor motor 104. Support rollers 126 can be seen within conveyor belt 124. Also, extension wheels 40 can be seen attached to extension wheel frames 42. In this particular embodiment, several extension wheel frames 42 are utilized, one for each extension wheel 40. However, it may be desirable to have a single extension wheel frame that extends the entire length of lateral members 55. It may also be desirable to have a series of wheel frames 40, each attaching to two or more extension wheels 40. Those skilled in the art will appreciate that any of these designs will be suitable. A single frame 42 extending the entire length of member 55 may be desirable as it will restrict access to the extension wheel track, and therefore increase the safety of the device. Chain attachment points 130 are located on the rear most support member 53. Conveyor chain 112, that is driven by extension motor 100 are attached to attachment points 130. This allows the movement of drive chains 112 to extend extensible conveyor 12.

In this particular embodiment, two drive chains 112 are used. However, those skilled in the art will realize that only one or many more than two drive chains may be used. Two or more drive chains generally provide smoother motion of the extensible conveyor period. Those skilled in the art will also appreciate that there are a variety of chain or rack and pinion designs that may be utilized in this invention. Those skilled in the art will also appreciate that the heavier the loads being transferred, the stronger the chain will need to be.

Front wedge 57 has three rollers 132. As is shown in the following figures and in FIG. 2, front wedge is wedge shaped. This facilitates loading and removal of loads being transferred. In this particular embodiment, three front rollers 132 are shown. Rollers 132 are shown side by side. Those skilled in the art will appreciate that it may be desirable to have one long roller, or, alternatively, several smaller rollers. In addition, it may also be desirable to have rollers next to each other and/or in front of and in back of each other. These rollers support the forward end of the extensible conveyor while allowing it to easily roll across the floor.

Figure 10:
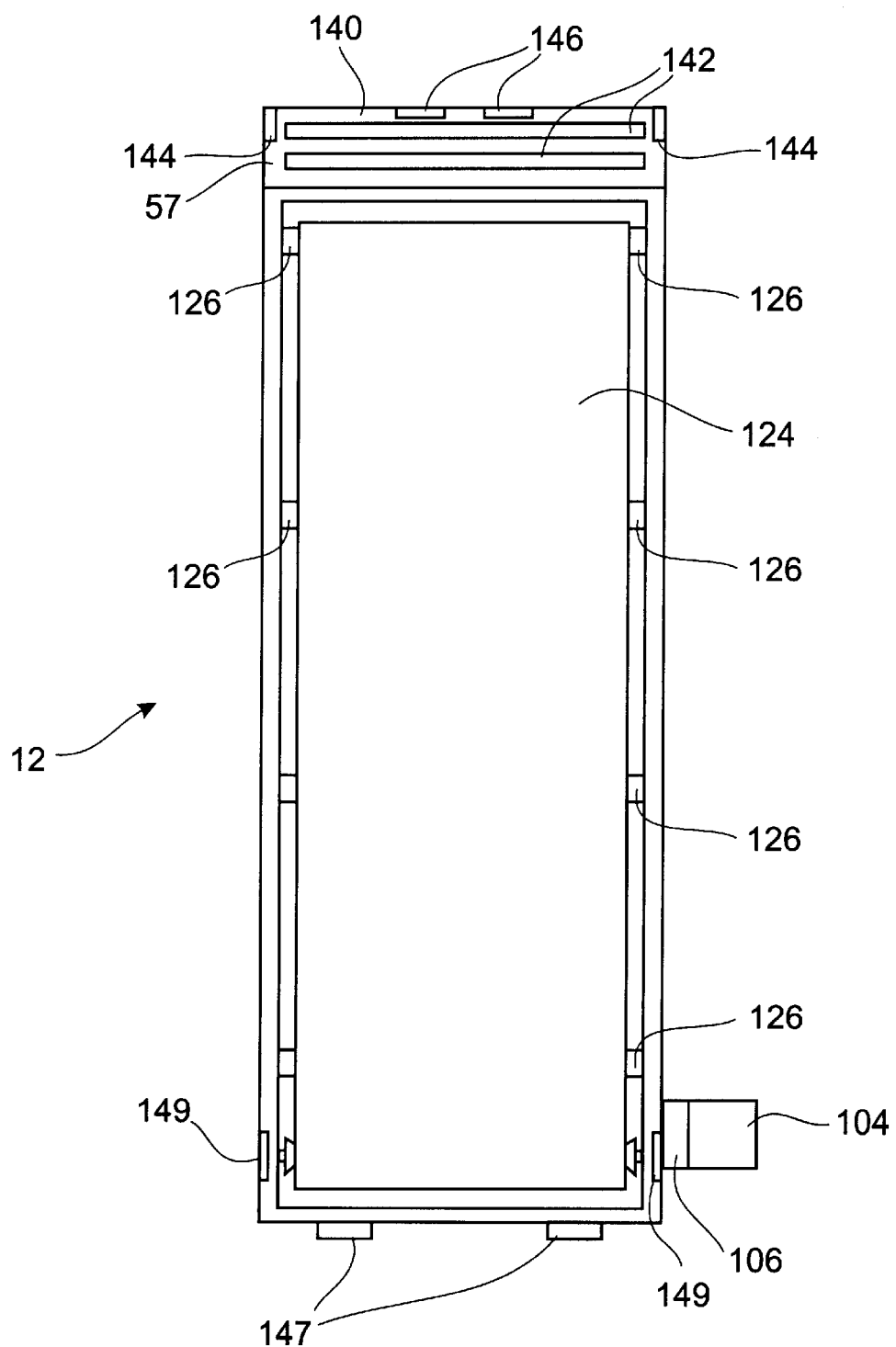
FIG. 10 shows a top plan view of the extensible conveyor of the invention.

FIG. 10 shows a top plan view of the forward portion of the extensible conveyor 12. Front wedge 57 has top rollers 142. These rollers facilitate movement of the load being transferred off the forward end of the extensible conveyor. Conveyor belt 124 moves in the forward direction, such that the load is moved off the extensible conveyor. As the load passes over the front wedge 57, top rollers 142 ease the transition of the load. Alignment lasers 144 are located on either side of the front wedge 57. Alignment lasers 144 point parallel to one another in the forward direction. Alignment lasers 144 are used to ensure that the load transfer device is properly aligned with the load carrying compartment into which it transfers the load. Those skilled in the art will be familiar with such alignment tools. Those skilled in the art will also appreciate there are other methods of properly aligning the load transfer device. An alternative alignment tool would be extensible alignment rods that may be extended and retracted from the front of the load device. These alignment arms would be extended into the load carrying compartment to ensure that the load transfer device was properly aligned with it. However, those skilled in the art will appreciate that more modern devices, such as laser alignment devices are much faster and more accurate.

FIG. 10 also shows safety devices 146. Sensors 146 detect the presence of persons or objects within the load carrying compartment as the conveyor is being extended into the compartment. Those skilled in the art will appreciate that there are a number of sensors that may be used. In this particular embodiment, infrared sensors are used to detect the presence of persons.

It may be more desirable to use extending antenna-like feelers as they would detect objects as well as persons. At the rear sides of the extensible conveyor 12 are similar safety sensors 147. These detect objects and/or persons that are on the base frame as the conveyor is retracted. A person stuck on the base frame as the conveyor retracts may be injured. An additional safety device of a perimeter light beam will disallow people from entering into the machine space. The controller 22 shown in FIG. 6 will also have emergency stop switches. Although not shown in this embodiment, those skilled in the art will appreciate that it may be desirable to place emergency stop switches at other locations on the load transfer device. Front wedge 57, and the rear of the base frame are two such places. Laser eyes 149 are located near the rear of the conveyor. These sensors are used once the load to be transferred has been fully loaded onto the load transfer device. These laser sensors check that none of the load overhangs either side of the extensible conveyor. This ensures that the load will fit properly into the load carrying compartment. Those skilled in the art will appreciate that this is one of a variety of ways to check that the load is of the proper size. Persons utilizing the load transfer device may simply check this visually. However, using lasers or other optics is usually more accurate.

FIGS. 11–13 show how an optic aligning device used in conjunction with pistons 18 and can align the load transfer device with a load carrying compartment. FIG. 11 shows a semi-trailer 180 backed up to a loading dock 190. In FIG. 11, the trailer has been precisely lined up with the loading docks door and is therefore precisely aligned with the load transfer device. Optic beam 170 travels the entire length of the trailer, parallel to trailer sidewall 182.

FIG. 12 shows a trailer 180 that has not been precisely aligned with docking bay 190. When aligning optic beam 170 is activated, it points in the direction of line 176 and intersects the side of the trailer 182. This indicates to the operators of the load transfer device that the device and the load carrying compartment are not precisely aligned and that adjustment is required. Those skilled in the art will appreciate that backing a semi-trailer to a loading dock is very difficult to accomplish with a high degree of precision. Thus, the situation presents it in FIG. 12 is much more common than that of FIG. 11.

FIG. 13 illustrates the position of a load transfer device after it has been adjusted to compensate for the angle of semi-trailer 180. Hydraulic piston 118 has been actuated so as to move the forward end of the load transfer device in the direction of directional arrow 172. Hydraulic piston 20 has been actuated so as to move the rear of the load transfer device in the direction of directional arrow 174. Because of the track wheel design illustrated in FIG. 7, the device remains on track 32. In FIG. 13, optic beam 170 is now parallel with sidewall 182 and again travels the length of the trailer 180. The load transfer device is now ready to extend into the trailer 180 and transfer the load.

FIGS. 14–19 illustrate how a load is transferred into a load carrying compartment. While in this particular embodiment of the load transfer method, a trailer is used, this method may be utilized for any number of load carrying compartments. Cargo ships and cargo airplanes often use large compartments that are first loaded themselves and then loaded by crane or other means onto an airplane or ship. Similarly, a load transfer device may be used to transfer loads directly into train boxcars. Other land vehicles may also be loaded. Smaller trucks, package cars and vans may all be loaded using the load transfer device. The size of an individual load transfer device will depend on the type of compartment it is intended to load.

Figure 14:
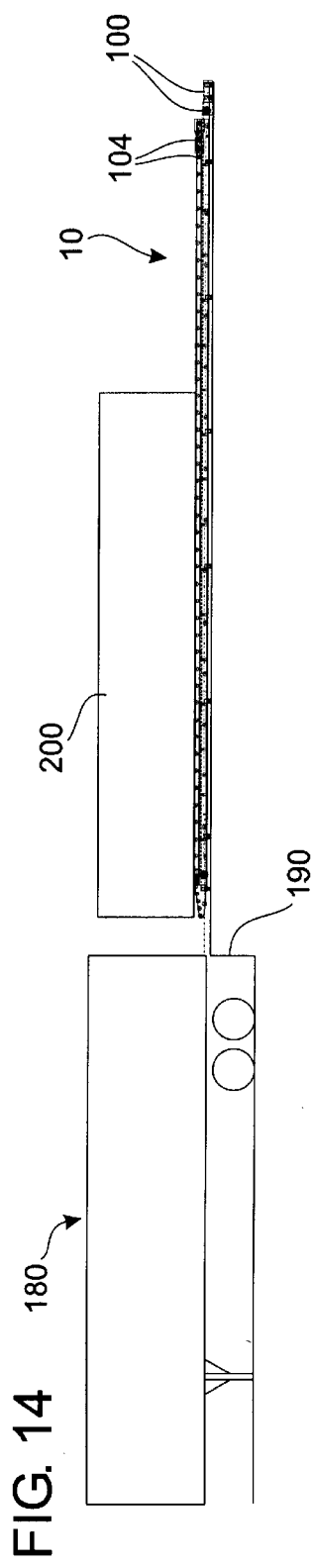
FIG. 14 shows a side plan view of the present invention illustrating the method of load transfer.
Figure 15:
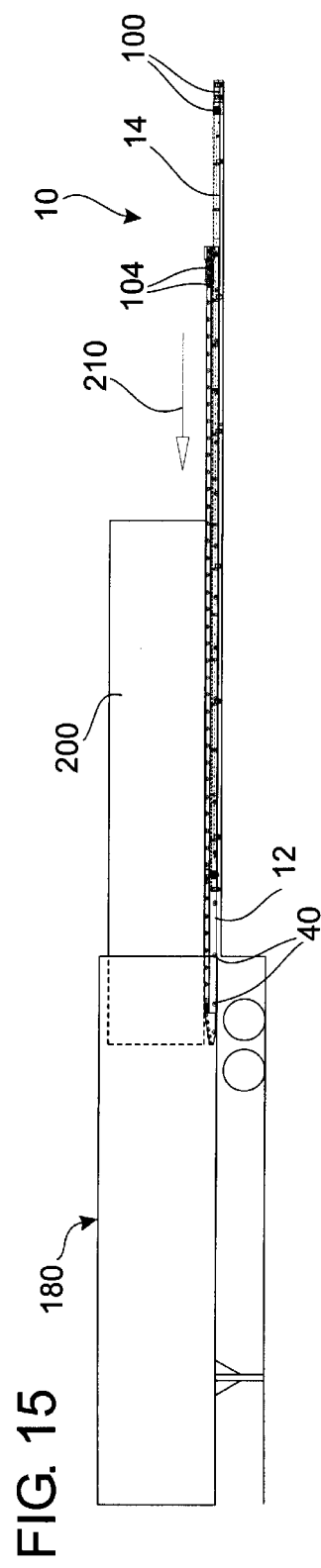
FIG. 15 shows a side plan view of the present invention illustrating the method of load transfer.
Figure 16:
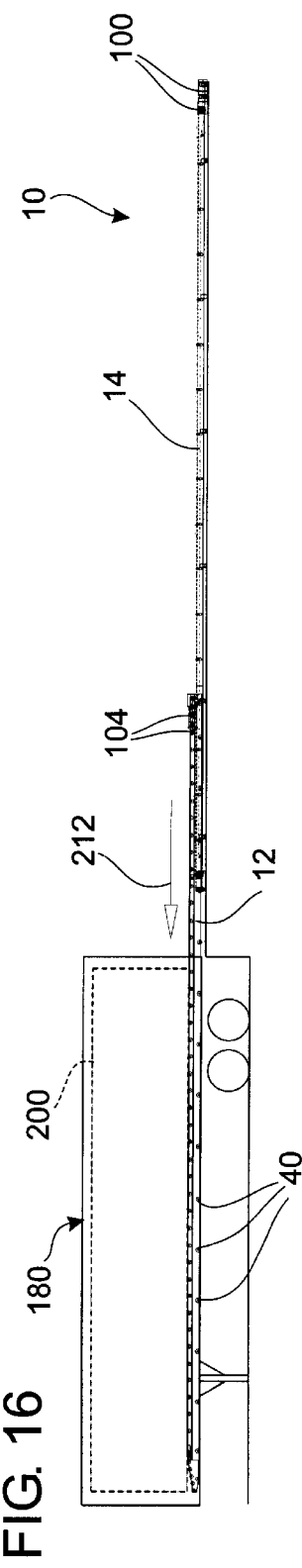
FIG. 16 shows a side plan view of the present invention illustrating the method of load transfer.

FIG. 14 shows a load transfer device 10 having a load 200 that is substantially equal to the maximum volume that trailer 180 may carry. As in FIG. 13, the device in FIG. 14 has been properly aligned with the trailer. FIG. 15 shows the load transfer device 10 after the extension motor has been actuated. When the extension motor is actuated, the conveyor 12 slowly extends in the direction of directional arrow 210, off base 14 and into trailer 180. The speed with which the conveyor extends will depend on how the extension motor has been adjusted. As conveyor 12 extends off base 14 extension wheels 40 move out of extension wheel track 30. The dual function of the extension wheels 40 then becomes apparent. As conveyor 12 extends into the trailer 180, extension wheels 40 contact the floor and support conveyor 12. without the support provided by extension wheels 40, the device would not operate. FIG. 16 shows the load transfer device in a fully extended position. How far conveyor 12 extends is controlled by the operator. The operator may adjust the extension of conveyor 12 to conform to the size of the trailer being loaded. Here, conveyor 12 has moved the maximum distance in the direction of directional arrow 212 and is only partially on base 14. Load 200 is entirely inside trailer 180.

FIGS. 17–19 show the second half of the load transferring process. In FIG. 17, the extension motor 100 on base 14 of device 10 is actuated such that conveyor 12 moves in the direction of directional arrow 216. At the same time that this begins, conveyor motor 104 is actuated such that the conveyor belt moves in the direction of directional arrow 214. The conveyor belt is actuated such that it moves at precisely the same rate at which conveyor 12 retracts. Because of the motion of the conveyor belt, load 200 remains unmoved within trailer 180. FIG. 18 shows the result of this continued motion. While conveyor 12 continues to retract out of the trailer, the load 200 remains inside trailer 180. In this particular embodiment, load 200 is a single large object. However, those skilled in the art will appreciate that the load transferring in substantially the same manner even when the load is comprised of several individual components.

FIG. 19 shows the position of the load 200 within the trailer 180 after the load transfer device 10 has fully retracted conveyor 12. The trailer is now fully loaded and ready to be transported. The load transfer device 10 is ready to receive a new load to be transferred into another trailer.

FIG. 20 illustrates an alternative embodiment of the present invention. Base 214 has two extension motors 224. Each extension motor 224 operates a separate conveyor. Two conveyors rest atop base 214. Conveyors 212 and 216 each have their own conveying motors 222 and operate independently. This allows the same load transfer device to load different sized load carrying compartments. In addition, alternative embodiment 210 has hydraulic pistons located outside of base frame 214. However, they operate in the same manner and allow the transfer device to be aligned with load carrying compartments. Those skilled in the art will also appreciate that it is possible to utilize 1 motor having a more complex gear system such that a single motor may actuate 1 or both extensible conveyors either alternatively or at the same time. Those skilled in the art will also appreciate that it would be relatively easy to design the invention such that a single motor powers both the conveyor belt 124 and extension drive chain 112. However, this is usually not preferable due to the increased power requirements placed upon such a motor.

Figure 21:
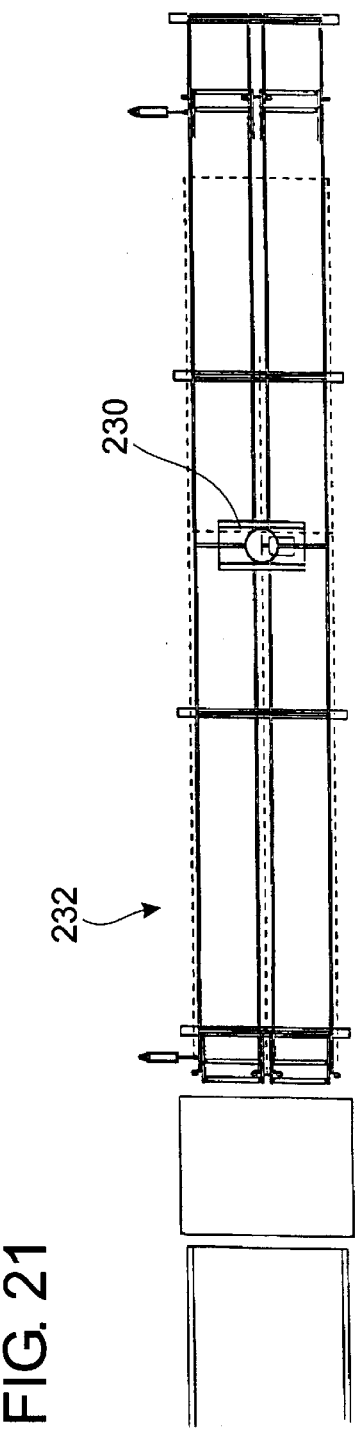
FIG. 21 shows a top plan view of an alternative embodiment of the present invention.
Figure 22:
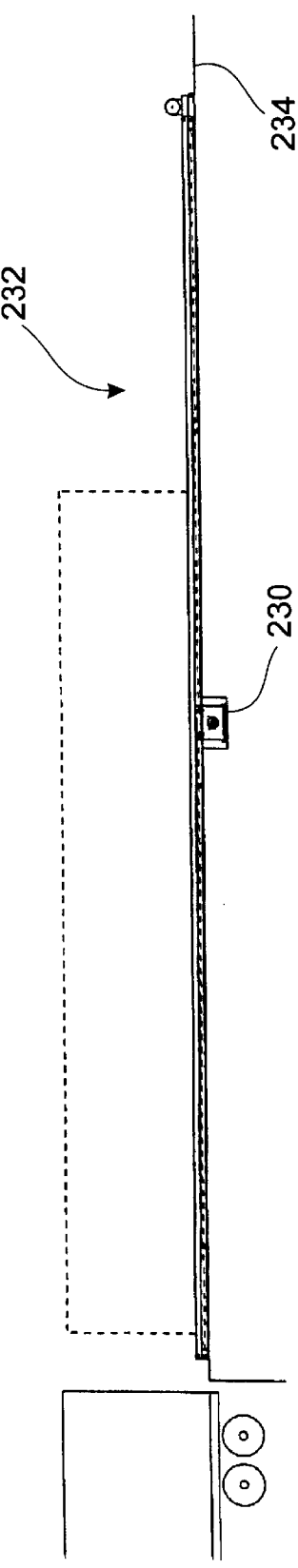
FIG. 22 shows a top plan view of an alternative embodiment of the present invention.

FIGS. 21 and 22 show a top down and side view of another alternative embodiment of the present invention. Alternative load transfer device 232 is very similar to the device shown in FIG. 20. In this particular device, track wheels and track are not used to provide a swiveling action for the load transfer device. Rather, the pivot point 230 is inserted into the floor of loading dock 234. This embodiment is not preferred. The pivot action provides for a more restricted range of motion than the wheel and track swiveling method. In addition, it requires that a pivot point be installed into the dock floor. It is generally much easier to apply a small track to the floor of dock 234 itself rather than to have to dig into the floor of dock 234. However, in some situations, the pivot point design of device 232 may prove beneficial.

Figure 23:
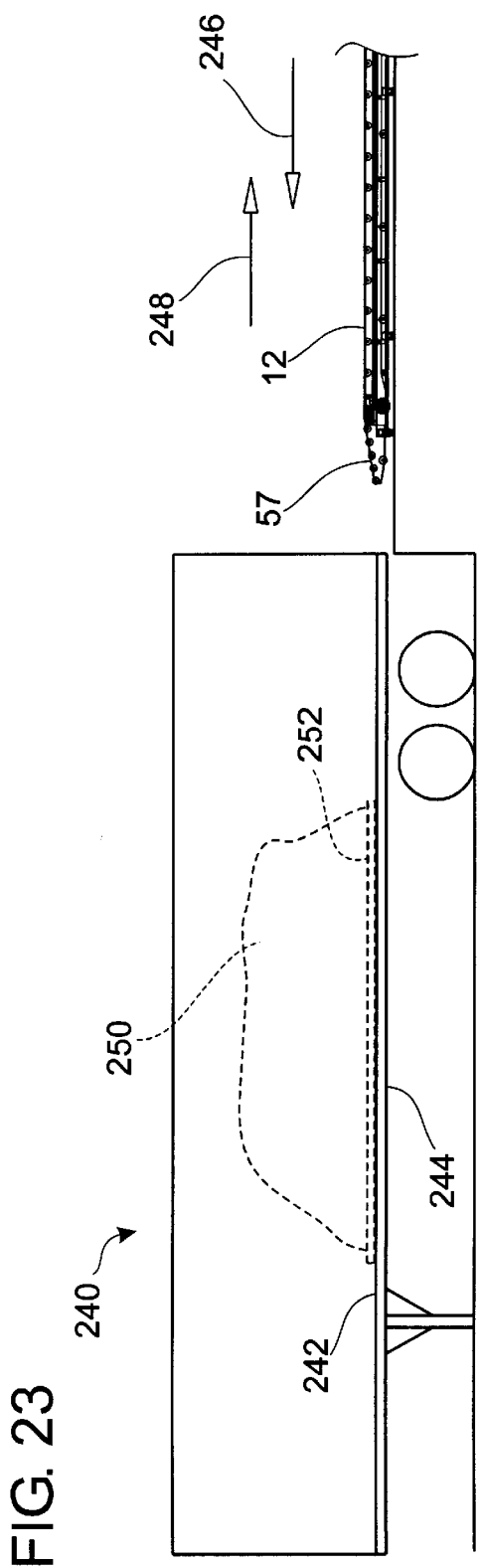
FIG. 23 shows a side plan view of the invention illustrating the method of removing a load from a load carrying compartment.
Figures 24, 25, 26:
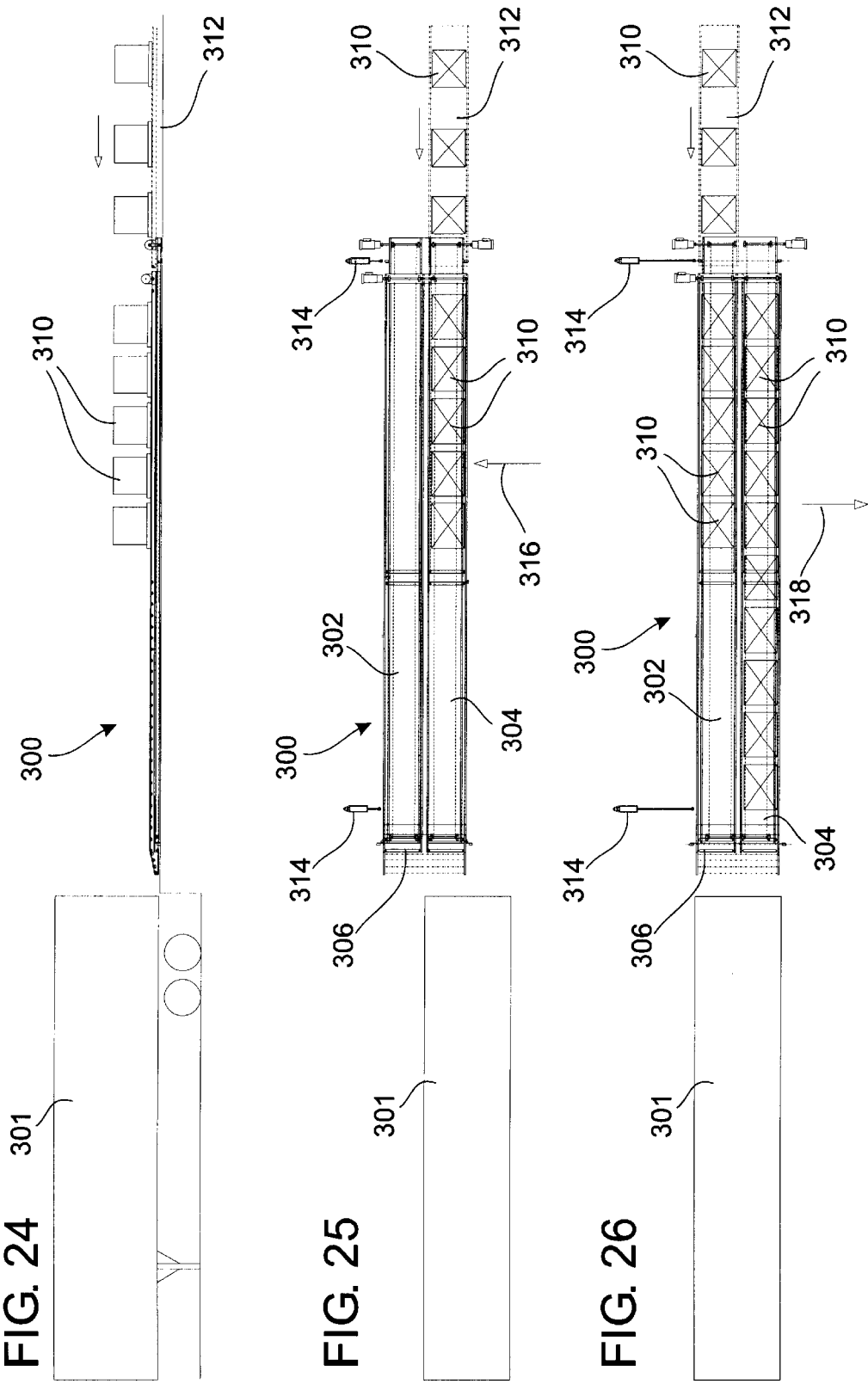
FIG. 24 is a side view of an alternative embodiment of the invention.
FIG. 25 is a top plan view of an alternative embodiment of the invention.
FIG. 26 is a top plan view of an alternative embodiment of the present invention.

While the transfer device and its method of use has been described primarily as the loading of load carrying compartments, it is also possible to unload compartments with the present invention. Generally, slight modification must be made to a trailer or other load carrying compartment in order to facilitate load removal with the load transfer device. FIG. 23 illustrates such a modified trailer. Trailer 240 has a rail 242 that extends the entire length of the trailer. Rails 242 are located on either sidewall of the trailer. They are located approximately 6 inches from floor 244 of trailer 240. They extend approximately 6 inches inward into the interior of trailer 240. The load 250 within the trailer rests on pallet 252. Pallet 252 is wide enough to extend the entire width of the trailer. As conveyor 12 moves in the direction of directional arrow 246, its forward wedge 57 moves underneath pallet 252. The conveyor belt on conveyor 12 moves in the direction of directional arrow 248 at the same rate at which conveyor 12 is extended into the trailer. The wedge shape of front wedge 57 in conjunction with the movement of the conveyor belt pulls pallet 252 and load 250 onto the load transfer device. The conveyor belt is then turned off and conveyor 12 is retracted onto its base frame. In this method, a compartment may be unloaded.

FIGS. 24–28 show an alternative embodiment of the present invention. Like extensible conveyor 210 shown in FIG. 20, extensible conveyor 300 has two conveyors 302 and 304. However, unlike conveyor 210, extensible conveyor 300 has only one extending frame 306. While conveyor belts 302 and 304 may be independently activated, they extend simultaneously.

A second conveyor 312 that does not extend brings boxes 310 to be loaded to the side of conveyor 300 that does not extend. Pistons 314 move extensible conveyor 300 in the direction of directional arrow 316. Once conveyors 304 and 312 are aligned, pistons 314 stop. Conveyor 312 is then activated and brings boxes 310 to the end of the conveyor. Conveyor belt 304 is then also activated so that boxes 310 move on to conveyor belt 304.

When conveyor belt 304 is fully loaded, pistons 314 move the extensible conveyor 300 in the direction of directional arrow 318. Pistons 314 stop when conveyor 312 is aligned with conveyor belt 302. Conveyor belt 302 is then loaded in the same fashion as conveyor belt 304.

Figure 27:
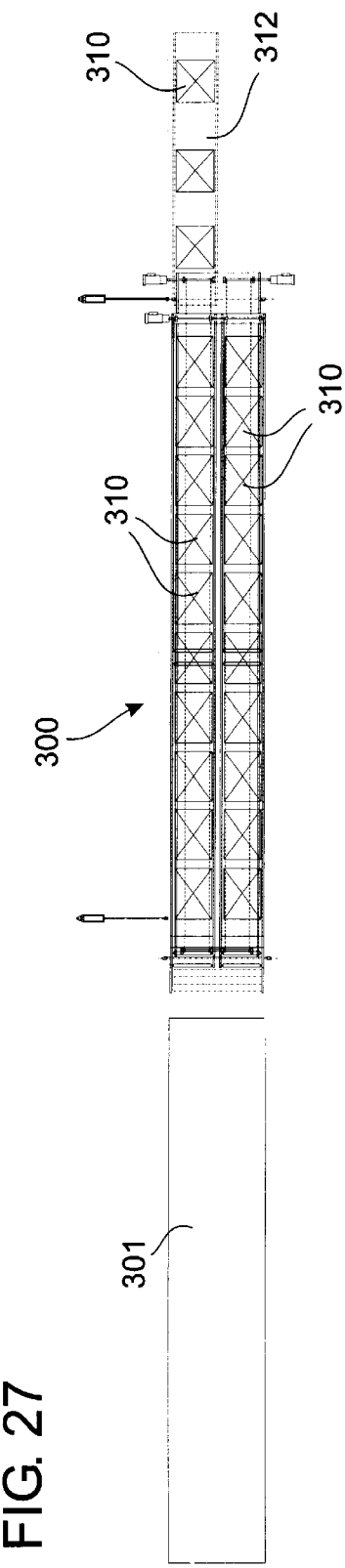
FIG. 27 is a top plan view of an alternative embodiment of the invention.
Figure 28:
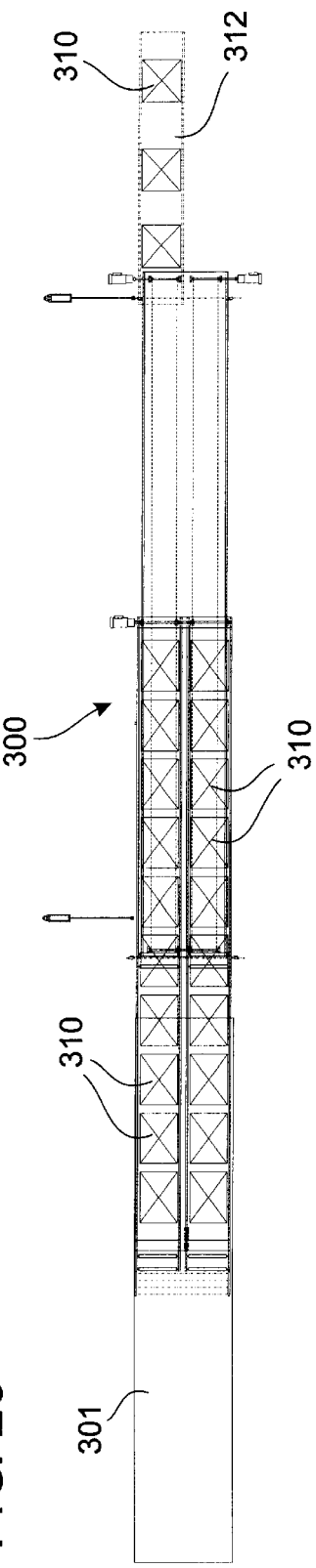
FIG. 28 is a top plan view of an alternative embodiment of the invention.

FIG. 27 shows a top down view of a fully loaded extensible conveyor 300. It is now ready to be extended into trailer 301. FIG. 28 shows extensible frame 306 entering the trailer 301 where it will deposit the load as described above. Use of one or more conveyors 312 allows for rapid loading of a trailer.

The embodiments described here all utilize conveyor belts on their extensible frames. However, those skilled in the art will appreciate that other conveying means may also be used. Powered roller bars are an example of an alternative conveying means that would be suitable for the present invention.

An especially advantageous use for this rapid load transfer device is that it may be utilized when insulation is a concern. When loading and unloading refrigerated compartments, the longer the doors are left open, the more energy is wasted. Therefore, the ability to rapidly transfer a load saves both time and energy.

Whereas, the present invention has been described in relation to the drawings attached hereto, it should be understood that other and further modifications, apart from those shown or suggested herein, may be made within the spirit and scope of this invention.

What is claimed is:

1. A load transfer device comprising:
   at least one extensible conveyor having a width and a length that is substantially equivalent to the width and the length of a load carrying compartment;
   conveying means attached to the top of said extensible conveyor;
   a base frame that rests upon a load carrying compartment area floor;
   a first motor that extends said extensible conveyor and a second motor that actuates said conveying means, wherein said conveyor is slidably attached to said frame such that it may be extended into and supported by the load carrying compartment; and
   a swiveling means adapted for moving at least two points of said conveyor for accurately aligning all of said extensible conveyor with a load carrying compartment comprising two tracks, at least two track wheels and at least two horizontally actuatable piston rods attached to said base frame.

2. The load transfer device of claim 1 wherein said piston rods are actuated by a hydraulic piston.

3. The load transfer device of claim 1 further comprising at least one alignment tool for accurately aligning said extensible conveyor with said load carrying compartment.

4. The load transfer device of claim 1 further comprising at least one emergency stop switch.

5. A load transfer device of claim 1 further comprising at least one sensor for detecting objects in front of or to a side of the extensible conveyor.

* * * * *